(12) United States Patent
Pappalardo et al.

(10) Patent No.: US 7,289,426 B2
(45) Date of Patent: Oct. 30, 2007

(54) METHOD AND LOW CONSUMPTION DEVICE FOR PARALLEL GENERATING CHANNELIZATION CODES FOR CDMA TRANSMISSIONS, IN PARTICULAR WH AND OVSF CODES

(75) Inventors: Francesco Pappalardo, Paterno' (IT); Daniele Lo Iacono, Messina (IT); Giuseppe Avellone, Palermo (IT); Agostino Galluzzo, Palma Di Montechiaro (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 884 days.

(21) Appl. No.: 10/669,167

(22) Filed: Sep. 23, 2003

(65) Prior Publication Data

US 2004/0131009 A1   Jul. 8, 2004

(30) Foreign Application Priority Data

Sep. 24, 2002   (IT) .................... TO2002A 000836

(51) Int. Cl.
    *H04J 11/00* (2006.01)
(52) U.S. Cl. ...................................... 370/208; 370/342
(58) Field of Classification Search ................ 370/208, 370/210, 335, 342; 375/130, 140, 146
    See application file for complete search history.

(56) References Cited

U.S. PATENT DOCUMENTS 6,885,652 B1 * 4/2005 Ozukturk et al. ........... 370/342
6,956,891 B2 * 10/2005 Tan .............................. 375/140
2002/0080856 A1   6/2002 Lattuca et al. ............... 375/140
2003/0058788 A1 * 3/2003 Kim et al. ................... 370/208
2003/0193914 A1 * 10/2003 Lomp et al. ................. 370/335

* cited by examiner

*Primary Examiner*—Kwang Bin Yao
*Assistant Examiner*—Sameer Aghera
(74) *Attorney, Agent, or Firm*—Lisa K. Jorgenson; Dennis M. de Guzman; Seed IP Law Group PLLC

(57) ABSTRACT

Described herein is a method for parallel generating Walsh-Hadamard (WH) channelization codes and Orthogonal Variable Spreading Factor (OVSF) channelization codes, which are channelization codes formed by a plurality of strings of antipodal digits, each having a given length L and being identifiable by respective indices I formed by strings of binary digits, each having a given length N equal to the logarithm in base two of the length L of the channelization codes, the antipodal digits of the channelization codes assuming the values +1 and −1 and the binary digits of said indices I assuming the values 0 and 1. The method according to the invention enables determination of the antipodal digits of the channelization codes according to the binary digits of the corresponding indices I, implementing specific EXOR logic operations, by means of which there are first generated intermediate binary digits, which are then encoded with the antipodal digits of the channelization codes using an encoding criterion according to which the intermediate binary digits 0 and 1 can be encoded, respectively, with the antipodal digits −1 and +1 or else with the antipodal digits +1 and −1 according to the type of binary encoding chosen a priori for the antipodal digits themselves.

16 Claims, 4 Drawing Sheets

METHOD AND LOW CONSUMPTION DEVICE FOR PARALLEL GENERATING CHANNELIZATION CODES FOR CDMA TRANSMISSIONS, IN PARTICULAR WH AND OVSF CODES

BACKGROUND OF THE INVENTION

1. Field of the Invention

The present disclosure relates to a method and a low consumption device for parallel generating channelization codes for CDMA transmissions, in particular but not exclusively, Walsh-Hadamard (WH) codes and Orthogonal Variable Spreading Factor (OVSF) codes.

2. Description of the Related Art

As is known, satellite telecommunication systems and mobile cellphone systems make widespread use of a transmission technique known as CDMA (Code Division Multiple Access), which uses channelization codes that enable the sharing of the same communication channel by a number of users. Both the transmitter and the receiver (terminal equipment) must therefore be able to generate these channelization codes for modulating the information to be transmitted and demodulating the information transmitted, respectively.

FIG. 1 illustrates, by way of example, a block diagram that illustrates the operations executed at the transmitter end to share the same communication channel by four users using four channelization codes, each formed by four bits, and the operations executed at the receiver end for recovering the information transmitted to a specific user.

With the CDMA scheme of the type illustrated in FIG. 1, each user is able to distribute or spread his signal over the entire transmission channel, which leads to the formation of four spread-spectrum signals, which are in any case orthogonal with respect to one another when they are superimposed to form a CDMA signal. At the receiver end, the regenerated composite signal is received and the signal corresponding to each user can be separated from the others by exploiting the orthogonality of the corresponding encodings.

Taking into account the transmission speeds currently used, which are moreover destined to continue to increase over time, it is important to be able to generate the codes in question in a simple and rapid way, preventing the occurrence of excessively high levels of energy consumption, above all taking into account the need for operating in the framework of mobile terminals.

Two of the channelization codes most widely used in CDMA transmission are the codes commonly known as Walsh-Hadamard (WH) and Orthogonal Variable Spreading Factor (OVSF), which, inter alia, have been chosen in view of their possible utilization in the framework of the UMTS mobile telephone standard.

For a more detailed treatment of WH codes, see for example "Digital Communications" by J. Proakis, published by McGraw-Hill, pp. 422 et seq., and "Introduction to Spread Spectrum Communication" by Roger L. Peterson, published by Prentice-Hall, pp. 542 et seq., whilst for a more detailed treatment of OVSF codes, useful reference may be made to the standard 3G TS 25.213 V3.2.0 UMTS standard document, Release 2000-03.

The WH and OVSF codes are orthogonal with respect to one another, i.e., there applies to them the property that for each pair of codes the cross correlation is zero, and both are vector functions of two variables, which are the length L and the index I of the codes in which the length L is in general a power of 2 (i.e., $2^N$ with N an integer), and the index I is a number ranging from 0 to L−1 and can be represented by means of N binary digits.

The set of all the codes can be represented by means of square matrices having a number of rows and of columns equal to the length L of the codes, and in which each row is a respective code, to which is associated a respective value of the index I of the code, which index is, in effect, the address of the corresponding row of the matrix. In addition, each element of the matrix is represented by an antipodal digit equal to "+1" or "−1".

Given in what follows, by way of example, are the matrices of WH codes for L equal to 2, 4 and 8:

$$L = 2 \qquad A = \begin{bmatrix} +1 & +1 \\ +1 & -1 \end{bmatrix}$$

$$L = 4 \qquad B = \begin{bmatrix} +A & +A \\ +A & -A \end{bmatrix} = \begin{bmatrix} +1 & +1 & +1 & +1 \\ +1 & -1 & +1 & -1 \\ +1 & +1 & -1 & -1 \\ +1 & -1 & -1 & +1 \end{bmatrix}$$

$$L = 8 \qquad C = \begin{bmatrix} +B & +B \\ +B & -B \end{bmatrix} = \begin{bmatrix} +1 & +1 & +1 & +1 & +1 & +1 & +1 & +1 \\ +1 & -1 & +1 & -1 & +1 & -1 & +1 & -1 \\ +1 & +1 & -1 & -1 & +1 & +1 & -1 & -1 \\ +1 & -1 & -1 & +1 & +1 & -1 & -1 & +1 \\ +1 & +1 & +1 & +1 & -1 & -1 & -1 & -1 \\ +1 & -1 & +1 & -1 & -1 & +1 & -1 & +1 \\ +1 & +1 & -1 & -1 & -1 & -1 & +1 & +1 \\ +1 & -1 & -1 & +1 & -1 & +1 & +1 & -1 \end{bmatrix}$$

As may be noted, the matrices of the WH codes are obtainable by means of a recursive process, according to which the matrix of the WH codes having a length $L=2^N$ can be obtained starting from the matrix of the WH codes having a length $L=2^{(N-1)}$ according to the scheme indicated, i.e., by constructing a 2×2 square matrix, in which, for L>2, the elements (1,1), (1,2) and (2,1) are equal to the matrix of the WH codes having a length $L=2^{(N-1)}$, whilst the element (2,2) is equal to the matrix of the WH codes having a length $L=2^{(N-1)}$ with sign changed, i.e., in which the sign of the single elements has been inverted. For L=2, instead, the generating matrix appearing above, also referred to as fundamental matrix, is used.

Given by way of example in what follows, instead, are the matrices of the OVSF codes for L equal to 2, 4 and 8, which differ from the matrices of the WH codes having a corresponding length as regards the position of some rows:

$$L = 2 \qquad A = \begin{bmatrix} +1 & +1 \\ +1 & -1 \end{bmatrix}$$

$$L = 4 \qquad B = \begin{bmatrix} +1 & +1 & +1 & +1 \\ +1 & +1 & -1 & -1 \\ +1 & -1 & +1 & -1 \\ +1 & -1 & -1 & +1 \end{bmatrix}$$

$$L = 8 \qquad C = \begin{bmatrix} +1 & +1 & +1 & +1 & +1 & +1 & +1 & +1 \\ +1 & +1 & +1 & +1 & -1 & -1 & -1 & -1 \\ +1 & +1 & -1 & -1 & +1 & +1 & -1 & -1 \\ +1 & +1 & -1 & -1 & -1 & -1 & +1 & +1 \\ +1 & -1 & +1 & -1 & +1 & -1 & +1 & -1 \\ +1 & -1 & +1 & -1 & -1 & +1 & -1 & +1 \\ +1 & -1 & -1 & +1 & +1 & -1 & -1 & +1 \\ +1 & -1 & -1 & +1 & -1 & +1 & +1 & -1 \end{bmatrix}$$

For example, with reference to the matrices of WH and OVSF codes with length L=4, it may immediately be noted that the first row and the last row are identical to one another, whilst the second and third rows are inverted with respect to one another, i.e., with the second row of the matrix of the WH codes corresponding to the third row of the matrix of the OVSF codes and the third row of the WH codes corresponding to the second row of the matrix of the OVSF codes.

The same considerations apply in an identical way in the case with length L=8. Without wishing to enter into greater detail, it will be appreciated, for example, that also in this case the first and the last rows of the matrices of the two WH and OVSF codes are identical to one another whilst instead, for example, the second row of the matrix of the WH codes corresponds to the fifth row of the matrix of the OVSF codes.

In the solutions so far proposed for generating codes, such as the WH and OVSF codes, there is envisaged generation of the codes in a way that is altogether independent.

It is found, on the other hand, that the generation of the WH codes is simpler and hence less burdensome in terms of circuit complexity, requiring typically, for example, for codes with length L=8, a circuit complexity in the region of 200 logic gates.

The generation of the OVSF codes is in general more burdensome. For example, there has recently been proposed a solution in which, to generate OVSF codes with length L=8, recourse is had to a circuit with a complexity in the region of 400 logic gates.

In certain applications there arises, however, the need for being able to generate both of the codes. For example, with reference to the UMTS application cited previously, the US standards (for example the IS95CDMA standard) envisage the use of WH codes, whilst in Europe, for the same application, the use of OVSF codes has had preference.

In order to enable the creation of mobile terminals that are able to operate with different standards, it is therefore important to have available solutions that will enable generation of both codes in a simple and rapid way, minimizing the absorption of energy, the aim being to prevent having to resort to a purely additive solution based upon the use of a first generator for generating the WH codes and a second generator distinct from the first for generating the OVSF codes. This is a solution, which, as regards the degree of circuit complexity to which reference has been made previously, would involve the use of circuits with a complexity in the region of 600 logic gates.

In the literature, all the WH and OVSF codes are generated serially by means of synchronous circuits or look-up tables, usually implemented in the form of a RAM or equivalent component, in which the correspondence between the various values of the index and the respective code is stored. An example of a synchronous circuit with serial output for generating the WH codes is illustrated in FIG. 2. This is made up of a synchronous binary counter formed, for a WH code with $L=2^N$, by N flip-flops for the storage of the index I (address of the row of the matrix corresponding to the code), N flip-flops for the frequency dividers, N two-input XOR logic gates, an N-input OR logic gate, and a clock generator generating a clock at the required output frequency.

The circuit illustrated in FIG. 2 is, however, optimized only in applications where it is used as generator of channelization codes for CDMA transmissions, in which the channelization code is required to be generated serially, whilst it is far from satisfactory in applications, such as for example the loading of matched filters with FIR structure, in which the channelization codes need to be supplied in parallel. Up to the present day, in fact, for this type of applications the only choice left open has been to take the serial output from the circuit of FIG. 1 and send it to a serial-input-parallel-output (SIPO) register, the implementation of which requires a further 2N flip-flops, or else uses a specific look-up table.

BRIEF SUMMARY OF THE INVENTION

Embodiments of the present invention provide a method and a low consumption device for parallel generating channelization codes for CDMA transmissions, in particular WH and OVSF codes in one embodiment.

BRIEF DESCRIPTION OF THE SEVERAL VIEWS OF THE DRAWING(S)

For a better understanding of the present invention there is now described an embodiment, which is provided purely by way of non-limiting example, with reference to the attached drawings, in which.

DETAILED DESCRIPTION OF THE INVENTION

Figure 1:
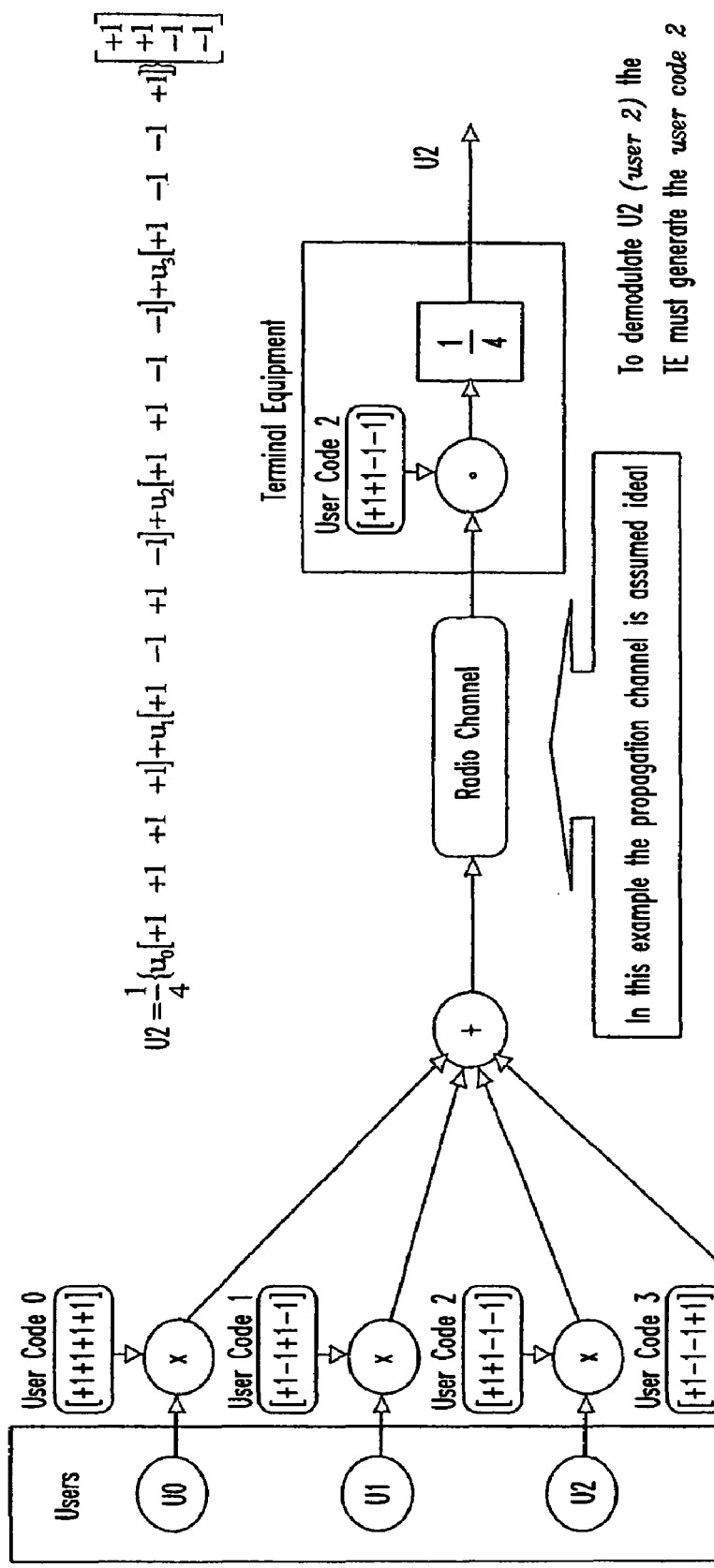
FIG. 1 shows a block diagram for transmitting and receiving information by sharing the same communication channel using channelization codes.
Figure 2:
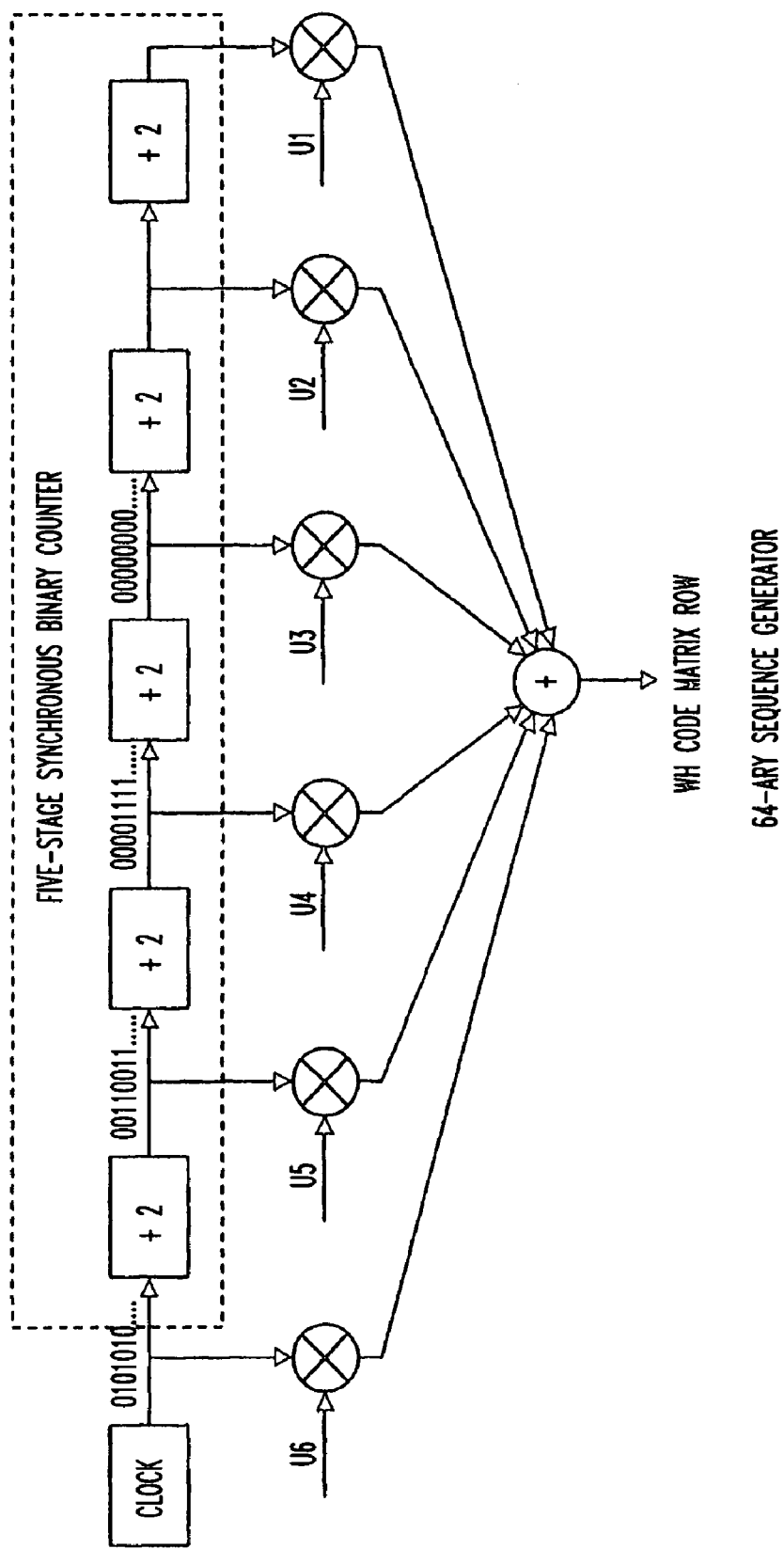
FIG. 2 shows a synchronous circuit with serial output for generating WH codes according to the prior art.

Embodiments of a method and low consumption device for parallel generating channelization codes for CDMA transmissions, in particular WH and OVSF codes are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

An embodiment of the present invention stems from an analysis of the particular structure of the matrices of WH and OVSF codes, an analysis which has enabled determination of an extremely simple relation, which enables generation of WH or OVSF codes starting from the corresponding indices.

Considering, for example, WH codes with length L=16 and assuming use of an encoding criterion according to which each element "+1" of the matrix of the WH codes is encoded with a bit having a logic value "1" and each element "−1" of the matrix of the WH codes is encoded with a bit having a logic value "0", it has been noted that the sixteen bits, hereinafter designated by $U_i$, with $0 \leq i \leq 15$, of a WH code encoded according to the criterion referred to above can be calculated according to the four bits, hereinafter designated by $I_k$, with $0 \leq k \leq 3$, of the corresponding index I by means of the following relations:

$U_0 = 1$ $U_1 = U_0 \oplus I_0$ $U_2 = U_0 \oplus I_1$ $U_3 = U_1 \oplus I_1$ $U_4 = U_0 \oplus I_2$ $U_5 = U_1 \oplus I_2$ $U_6 = U_2 \oplus I_2$ $U_7 = U_3 \oplus I_2$ $U_8 = U_0 \oplus I_3$ $U_9 = U_1 \oplus I_3$ $U_{10} = U_2 \oplus I_3$ $U_{11} = U_3 \oplus I_3$ $U_{12} = U_4 \oplus I_3$ $U_{13} = U_5 \oplus I_3$ $U_{14} = U_6 \oplus I_3$ $U_{15} = U_7 \oplus I_3$ in which the symbol $\oplus$ represents the EXOR logic operation.

Once, then, the criterion adopted for encoding the elements of the matrices of the codes is known, from the string calculated it is then possible to trace back, in a simple and immediate way, to the corresponding WH code.

In general, the WH codes with length N can be generated using the following general formula:

$U_0 = 1$ $U_i = U_{i-2^k} \oplus I_k$ where:

$1 \leq i \leq 2^N - 1$ k is the integer part of the logarithm in base two of the decimal digit i, i.e., $k = \text{INT}[\log_2 i]$, $0 \leq k \leq N-1$ $I_k$ are the bits, from the least significant bit to the most significant bit, of the index I of the WH code to be generated, $U_i$ are the bits, from the least significant bit to the most significant bit, of the WH code to be generated, encoded according to the criterion referred to above.

Figure 3:
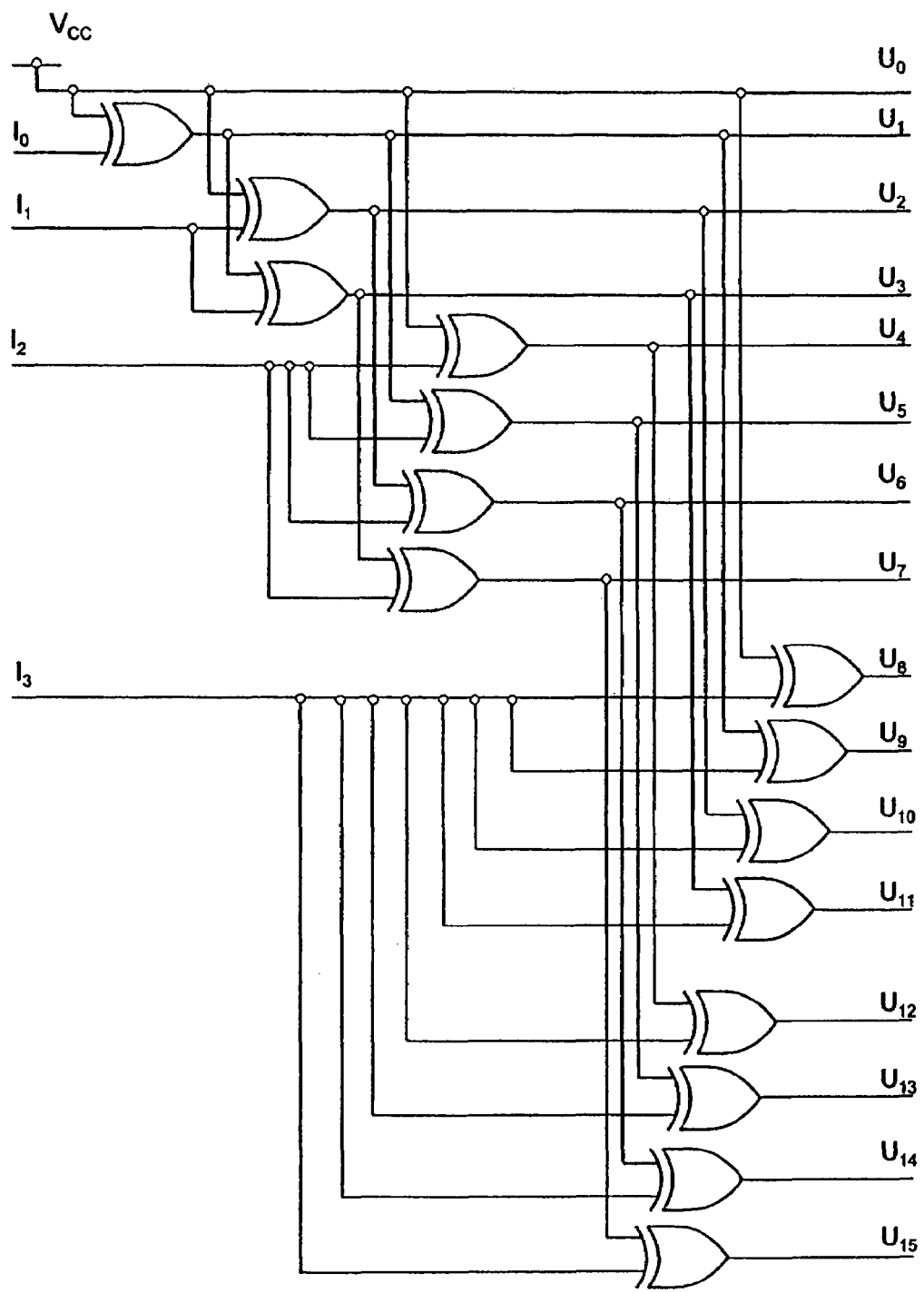
FIG. 3 shows a synchronous circuit with parallel output for generating WH codes according to one embodiment of the present invention.

For example, the WH code with length 16 and index I=0110, encoded according to the criterion appearing above, is 1100001111000011; in fact:

$U_0 = 1$ $U_1 = U_0 \oplus I_0 = 1$ $U_2 = U_0 \oplus I_1 = 0$ $U_3 = U_1 \oplus I_1 = 0$ $U_4 = U_0 \oplus I_2 = 0$ $U_5 = U_1 \oplus I_2 = 0$ $U_6 = U_2 \oplus I_2 = 1$ $U_7 = U_3 \oplus I_2 = 1$ $U_8 = U_0 \oplus I_3 = 1$ $U_9 = U_1 \oplus I_3 = 1$ $U_{10} = U_2 \oplus I_3 = 0$ $U_{11} = U_3 \oplus I_3 = 0$ $U_{12} = U_4 \oplus I_3 = 0$ $U_{13} = U_5 \oplus I_3 = 0$ $U_{14} = U_6 \oplus I_3 = 1$ $U_{15} = U_7 \oplus I_3 = 1$ FIG. 3 shows the logic circuit that implements the relations appearing above for parallel generating WH codes with length 16, encoded according to the criterion indicated above.

As may be noted, the logic circuit is of an asynchronous type and is formed by 15 EXOR logic gates with just two inputs. In general, the number of two-input EXOR logic gates necessary for obtaining a circuit for generating WH codes with length $L = 2^N$ is:

$$N\_XOR = \sum_{i=0}^{N-1} 2^N$$

It is immediately evident to a person skilled in the art how the same logic circuit shown in FIG. 3, and more precisely parts of this, can be used for parallel generating WH codes with length 2, 4 and 8, encoded according to the criterion outlined above.

An altogether similar path can be followed for parallel generating OVSF codes, the matrices of which, as mentioned previously, differ from the matrices of WH codes as regards the position of some rows.

In this connection, in fact, in the Italian Patent Application No. TO2000A000871 filed on Sep. 15, 2000 in the name of the present applicant, there has been proposed the use of one and the same code generator for generating both types of code, the code generator switching from the WH-code-generation function to the OVSF-code-generation function simply by modifying the index that identifies the rows within the matrices of the codes.

In particular, as code generator there is proposed the use of a WH code generator in that, all other parameters being equal, the generation of the WH codes is simpler in terms of circuit complexity, as compared to the generation of the OVSF codes.

In greater detail, amongst the various methods described in the aforesaid patent application, which enable mapping of the indices of the WH codes in the indices of the OVSF codes and vice versa, i.e., converting the indices of the WH codes into the corresponding indices of the OVSF codes and vice versa, what proves least burdensome in terms of occupation of memory, above all as the length L of the codes increases, is based upon the observation that the matrices of the WH codes are obtainable starting from the matrices of the OVSF codes, and vice versa, by simply swapping, in a specular fashion, the bits of the indices I.

The swapping operation is performed by supplying the string of bits representing an index of the WH codes to a unit that performs an operation of inversion of the position of the bits in the binary string, thus causing the most significant bit (MSB) to become the least significant bit (LSB), and vice versa.

Starting from this observation and taking into consideration OVSF codes with length L=16, the sixteen bits of the OVSF code can be calculated as a function of the four bits of the corresponding indices I by means of the following relations (assuming again there is used an encoding criterion according to which each element "+1" of the matrix is encoded with a bit of logic value "1" and each element "−1" of the matrix is encoded with a bit of logic value "0"):

$U_0=1$ $U_1=U_0 \oplus I_3$ $U_2=U_0 \oplus I_2$ $U_3=U_1 \oplus I_2$ $U_4=U_0 \oplus I_1$ $U_5=U_1 \oplus I_1$ $U_6=U_2 \oplus I_1$ $U_7=U_3 \oplus I_1$ $U_8=U_0 \oplus I_0$ $U_9=U_1 \oplus I_0$ $U_{10}=U_2 \oplus I_0$ $U_{11}=U_3 \oplus I_0$ $U_{12}=U_4 \oplus I_0$ $U_{13}=U_5 \oplus I_0$ $U_{14}=U_6 \oplus I_0$ $U_{15}=U_7 \oplus I_0$ In general, the OVSF codes with length L can be generated using following general formula:

$U_0=1$ $U_i = U_{i-2^k} \oplus I_{N-k-1}$

As may be noted, unlike what occurs in the WH codes, in the OVSF codes the least significant bit of the binary representation of the decimal digit i weights the most significant bit of the index I of the OVSF code to be generated.

For example, the OVSF code with length 16 and index I=0110, encoded according to the criterion appearing above, is:

$U_0=1$ $U_1=U_0 \oplus I_3=1$ $U_2=U_0 \oplus I_2=0$ $U_3=U_1 \oplus I_2=0$ $U_4=U_0 \oplus I_1=0$ $U_5=U_1 \oplus I_1=0$ $U_6=U_2 \oplus I_1=1$ $U_7=U_3 \oplus I_1=1$ $U_8=U_0 \oplus I_0=1$ $U_9=U_1 \oplus I_0=1$ $U_{10}=U_2 \oplus I_0=0$ $U_{11}=U_3 \oplus I_0=0$ $U_{12}=U_4 \oplus I_0=0$ $U_{13}=U_5 \oplus I_0=0$ $U_{14}=U_6 \oplus I_0=1$ $U_{15}=U_7 \oplus I_0=1$ i.e., 1100001111000011, and as may be noted, it coincides exactly with the WH code with length 16 and index I=0110 previously calculated and encoded according to the same criterion. The index 0110 is in fact palindrome, and hence by inverting the position of its bits the same index is always obtained.

Figure 4:
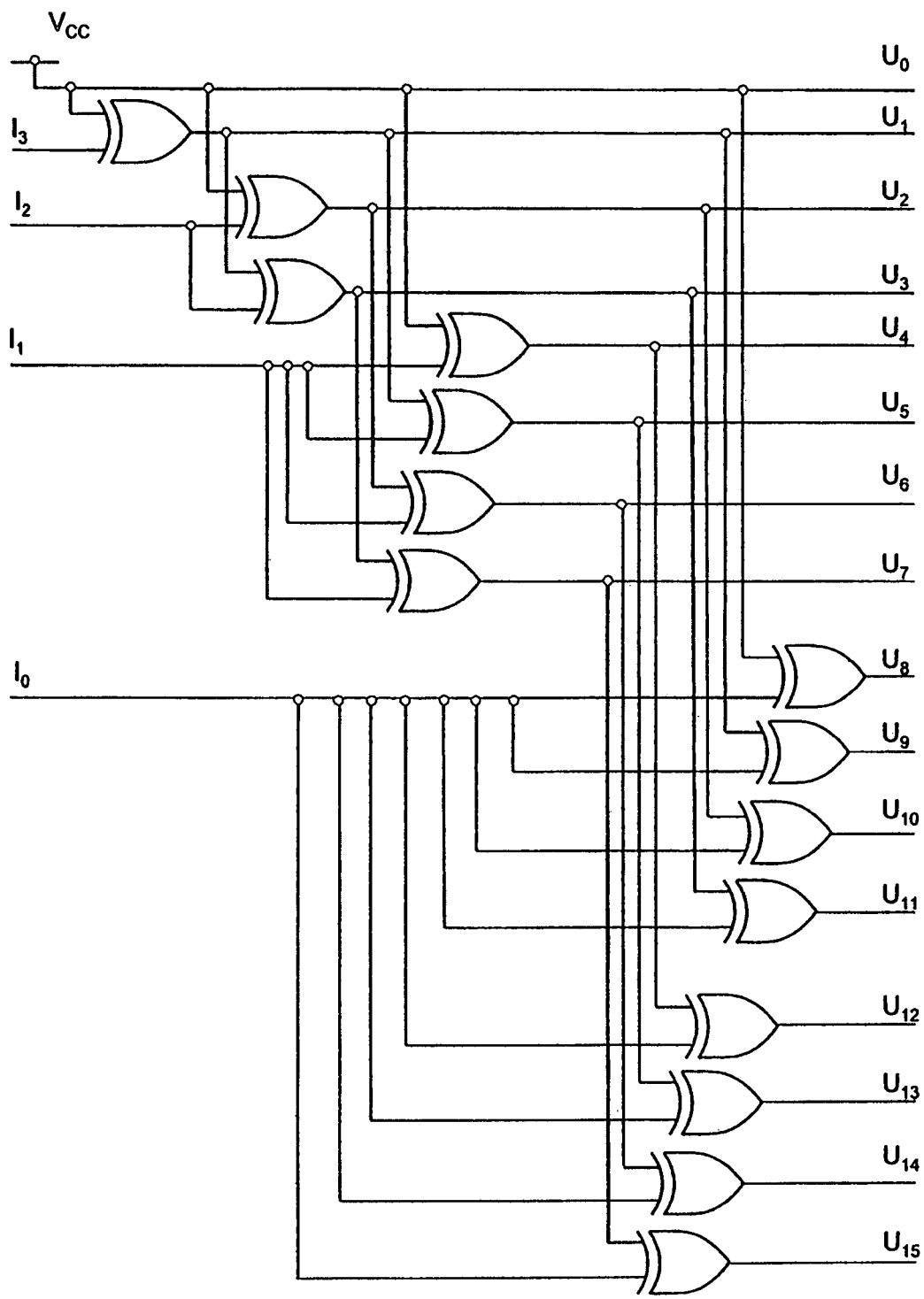
FIG. 4 illustrates a synchronous circuit with parallel output for generating OVSF codes according to one embodiment of the present invention.

The OVSF code with length 16 and index I=1010, encoded according to the criterion appearing above, is instead:

$U_0=1$ $U_1=U_0 \oplus I_3=0$ $U_2=U_0 \oplus I_2=1$ $U_3=U_1 \oplus I_2=0$ $U_4=U_0 \oplus I_1=0$ $U_5=U_1 \oplus I_1=1$ $U_6=U_2 \oplus I_1=0$ $U_7=U_3 \oplus I_1=1$ $U_8=U_0 \oplus I_0=1$ $U_9=U_1 \oplus I_0=0$ $U_{10}=U_2 \oplus I_0=1$ $U_{11}=U_3 \oplus I_0=0$ $U_{12}=U_4 \oplus I_0=0$ $U_{13}=U_5 \oplus I_0=1$ $U_{14}=U_6 \oplus I_0=0$ $U_{15}=U_7 \oplus I_0=1$ i.e., 1010010110100101, and coincides with the WH code with length 16 and index I=0101, encoded according to the same criterion. In fact for the latter we have:

$U_0=1$ $U_1=1 \oplus I_0=0$ $U_2 = U_0 \oplus I_1 = 1$ $U_3 = U_1 \oplus I_1 = 0$ $U_4 = U_0 \oplus I_2 = 0$ $U_5 = U_1 \oplus I_2 = 1$ $U_6 = U_2 \oplus I_2 = 0$ $U_7 = U_3 \oplus I_2 = 1$ $U_8 = U_0 \oplus I_3 = 1$ $U_9 = U_1 \oplus I_3 = 0$ $U_{10} = U_2 \oplus I_3 = 1$ $U_{11} = U_3 \oplus I_3 = 0$ $U_{12} = U_4 \oplus I_3 = 0$ $U_{13} = U_5 \oplus I_3 = 1$ $U_{14} = U_6 \oplus I_3 = 0$ $U_{15} = U_7 \oplus I_3 = 1$ FIG. 4 shows the logic circuit that implements the relations appearing above for parallel generating OVSF codes with length 16, which is architecturally identical to the one shown in FIG. 3, and the only difference between the two circuits lies in the order in which the bits of the indices I are supplied to the EXOR logic gates.

What was described previously with regard to the WH and OVSF codes is based, as has been said, upon the assumption that each element "+1" of the matrices of the codes is encoded with a bit of logic value "1" and each element "−1" of said matrices is encoded with a bit of logic value "0".

Should, instead, it be intended to adopt a different encoding criterion, according to which, for example, each element "+1" of the matrices of the codes will be encoded with a bit of logic value "0" and each element "−1" of said matrices will be encoded with a bit of logic value "1", in the circuits illustrated in FIGS. 3 and 4 it is sufficient to connect to ground (GND), instead of to the supply ($V_{CC}$), the line that defines the first bit $U_0$ of the codes, and in the relations appearing above that enable calculation of the bits of the codes starting from the bits of the indices it is sufficient to substituted $U_0=1$, with $U_0=0$.

A valid general formula both for WH codes and for OVSF codes is therefore the following:

$U_0 = X$ $U_i = U_{i-2^k} \oplus I_{Bk}$ where:

X is a binary encoding digit, the value of which depends upon the type of binary encoding chosen for the antipodal digits of the WH and OVSF codes, and in particular is 1 if the elements −1 and +1 in the matrices of the codes are encoded, respectively, with 0 and 1, whilst it is 0 if the elements −1 and +1 in the matrices of the codes are encoded, respectively, with 1 and 0; and $I_{Bk}$ are the binary digits of the indices I of the codes, and in particular for the WH codes range, as k increases from 0 to N−1, from the least significant bit (LSB) to the most significant bit (MSB), whilst for the OVSF codes range, as k increases from 0 to N−1, from the most significant bit (MSB) to the least significant bit (LSB).

The logic circuit that implements the operations appearing above described for parallel generating the WH and OVSF codes has numerous advantages as compared to the serial circuits according to the prior art or to the circuits which implement look-up tables. In particular, the logic circuit supplies the WH and OVSF codes in parallel and has a high speed of generation of the codes, whilst its occupation of area on the silicon is extremely small in so far as its creation involves the use of a decidedly small number of logic gates. Moreover, it has an extremely low power consumption in that it does not have clock generators or flip-flops that switch for supplying the result, but instead simply a combinatorial network.

Finally, it is clear that modifications and variations can be made to what is described and illustrated herein, without thereby departing from the sphere of protection of the present invention, as defined in the appended claims.

In particular, it is pointed out that even though embodiments of the present invention have been described with particular reference to the WH and OVSF channelization codes, it can be applied to any channelization code for CDMA transmissions that has characteristics similar to those of the WH and OVSF codes described herein.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. A method for parallel generating channelization codes, including Walsh-Hadamard (WH) channelization codes and Orthogonal Variable Spreading Factor (OVSF) channelization codes, said channelization codes being formed by a plurality of strings of antipodal digits, each having a length L and being identifiable by respective indices I formed by strings of binary digits, each having a length N equal to a logarithm in base two of the length L of said channelization codes, the antipodal digits of said channelization codes being able to assume values +1 and −1 and the binary digits of said indices I being able to assume values 0 and 1, said method comprising:

determining the antipodal digits of said channelization codes according to the binary digits of the corresponding indices I by implementing the following:

a) determining intermediate binary digits:

$U_0 = X$ $U_i = U_{i-2^k} \oplus I_{Bk}$ where:

$1 \leq i \leq 2^N - 1$ $k = \text{INT}[\log_2 i]$, $0 \leq k \leq N-1$ $I_{Bk}$ are the binary digits of the indices I of said channelization codes, X is a binary encoding digit, a value of which depends upon a type of binary encoding chosen for the antipodal digits of the channelization codes, and $\oplus$ represents logic operation EXOR; and b) encoding said intermediate binary digits with respective antipodal digits of said channelization codes according to said binary encoding digit X, said encoding being performed using a criterion according to which intermediate binary digits 0 and 1 are encoded, respectively, with antipodal digits −1 and +1 if the binary encoding digit X is equal to 1, whilst they are encoded with antipodal digits +1 and −1 if the binary encoding digit X is equal to 0.

2. The method according to claim 1 wherein the binary digits $I_{Bk}$ of the indices I of the WH channelization codes range, as k increases from 0 to N−1, from a least significant bit to a most significant bit.

3. The method according to claim 1 wherein the binary digits $I_{Bk}$ of the indices I of the OVSF channelization codes range, as k increases from 0 to N−1, from a most significant bit to a least significant bit.

4. A low consumption device for parallel generating channelization codes for CDMA transmissions, including Walsh-Hadamard (WH) channelization codes and Orthogonal Variable Spreading Factor (OVSF) channelization codes, said channelization codes being formed by a plurality of strings of antipodal digits, each having a length L and being identifiable by respective indices I formed by strings of binary digits, each having a length N equal to a logarithm in base two of the length L of said channelization codes, the antipodal digits of said channelization codes being able to assume values +1 and −1 and the binary digits of said indices I being able to assume values 0 and 1, said device comprising:
  processing means for determining the antipodal digits of said channelization codes according to the binary digits of the corresponding indices I, said processing means including:
  a) computation means for receiving the binary digits $I_{Bk}$, with $0 \leq k \leq N-1$, of the indices I of said channelization codes and a binary encoding digit X, a value of which depends upon a type of binary encoding chosen for the antipodal digits of the channelization codes, and for supplying intermediate binary digits:

$U_0 = X$ $U_i = U_{i-2^k} \oplus I_{Bk}$ where:
    $1 \leq i \leq 2^N - 1$
    $k = INT[\log_2 i]$, $0 \leq k \leq N-1$
    $\oplus$ represents EXOR logic operation; and
  b) encoding means for encoding said intermediate binary digits with respective antipodal digits of said channelization codes according to said binary encoding digit X, said encoding being performed using a criterion according to which intermediate binary digits 0 and 1 are encoded, respectively, with antipodal digits −1 and +1 if the binary encoding digit X is equal to 1, whilst they are encoded with antipodal digits +1 and −1 if the binary encoding digit X is equal to 0.

5. The device according to claim 4 wherein the binary digits $I_{Bk}$ of the indices I of the WH channelization codes range, as k increases from 0 to N−1, from a least significant bit to a most significant bit.

6. The device according to claim 4 wherein the binary digits $I_{Bk}$ of the indices I of the OVSF channelization codes range, as k increases from 0 to N−1, from a most significant bit to a least significant bit.

7. A device to parallel-generate first and second types of channelization codes for transmission, the channelization codes being formed by a plurality of strings of antipodal digits, each having a length L and being identifiable by respective indices I formed by strings of binary digits, each having a length N equal to a logarithm in base two of the length L of the channelization codes, the antipodal digits of the channelization codes being able to assume values +1 and −1 and the binary digits of the indices I being able to assume values 0 and 1, the device comprising:
  a processor to determine the antipodal digits of the channelization codes according to the binary digits of the corresponding indices I, the processor having:
  a) a computation unit to receiving the binary digits $I_{Bk}$, with $0 \leq k \leq N-1$, of the indices I of the channelization codes and a binary encoding digit X, a value of which is based at least in part upon a type of binary encoding chosen for the antipodal digits of the channelization codes, the computation unit able to supply intermediate binary digits:

$U_0 = X$ $U_i = U_{i-2^k} \oplus I_{Bk}$ where:
    $1 \leq i \leq 2^N - 1$
    $k = INT[\log_2 i]$, $0 \leq k \leq N-1$
    $\oplus$ represents a logic operation; and
  b) an encoder unit coupled to the computation unit to encode the intermediate binary digits with respective antipodal digits of the channelization codes according to the binary encoding digit X, the encoder unit able to perform the encoding based on a criterion according to which intermediate binary digits 0 and 1 are encoded, respectively, with antipodal digits −1 and +1 if the binary encoding digit X is equal to 1, and the intermediate binary digits are encoded with antipodal digits +1 and −1 if the binary encoding digit X is equal to 0.

8. The device of claim 7 wherein the first and second types of channelization codes respectively comprise Walsh-Hadamard-like and Orthogonal Variable Spreading Factor-like codes.

9. The device of claim 7 wherein the transmission comprises a code division multiple access (CDMA)-like transmission.

10. The device of claim 7 wherein the binary digits $I_{Bk}$ of the indices I of the first type channelization codes range, as k increases from 0 to N−1, from a least significant bit to a most significant bit.

11. The device of claim 7 wherein the binary digits $I_{Bk}$ of the indices I of the second type of channelization codes range, as k increases from 0 to N−1, from a most significant bit to a least significant bit.

12. The device of claim 7 wherein either one or both of the computation unit and encoder unit include a plurality of dual-input logic gates, some of which are coupled to receive a reference voltage on a first input terminal and a value of one of the indices I on a second input terminal.

13. The device of claim 12 wherein the logic gates are coupled to perform the logic operation, which comprises an EXOR operation.

14. The device of claim 12 wherein the reference voltage comprises ground.

15. The device of claim 12 wherein the reference voltage comprises a voltage from a voltage supply.

16. The device of claim 12 wherein the logic gates are coupled to provide respective binary digits $U_i$ at their output terminals.

* * * * *